B. G. NICE.
ANTIFRICTION WHEEL.
APPLICATION FILED SEPT. 19, 1913.

1,177,046.

Patented Mar. 28, 1916.

WITNESSES:

INVENTOR
*Budd G. Nice,*
BY
*Charles N. Butler*
ATTORNEY.

UNITED STATES PATENT OFFICE.

BUDD G. NICE, OF OGONTZ, PENNSYLVANIA.

ANTIFRICTION-WHEEL.

1,177,046.  Specification of Letters Patent.  Patented Mar. 28, 1916.

Application filed September 19, 1913. Serial No. 790,590.

*To all whom it may concern:*

Be it known that I, BUDD G. NICE, a citizen of the United States, residing at Ogontz, Montgomery county, Pennsylvania, have invented certain Improvements in Antifriction-Wheels, of which the following is a specification.

My invention is an improved ball bearing construction especially designed for use in or in connection with traction and belt wheels or pulleys, and its leading object is to provide a simple and inexpensive wheel comprising a sheet metal body having a race in combination with a hub having a race and balls in said races, whereby said body is journaled on said hub and adapted for taking radial thrusts.

Figure 1:
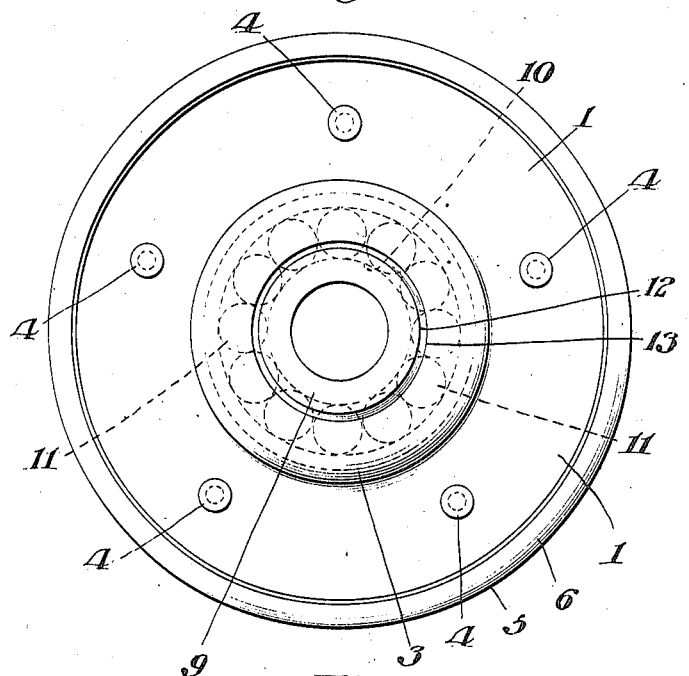
Figure 2:
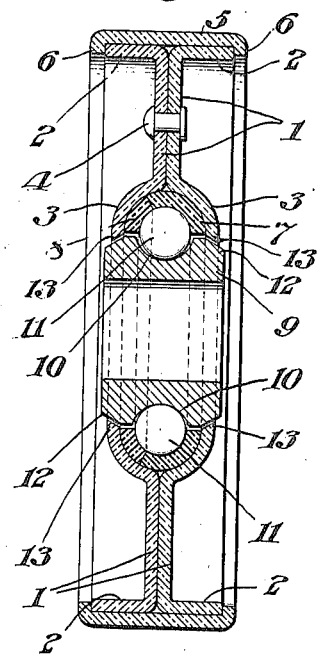
Figure 3:
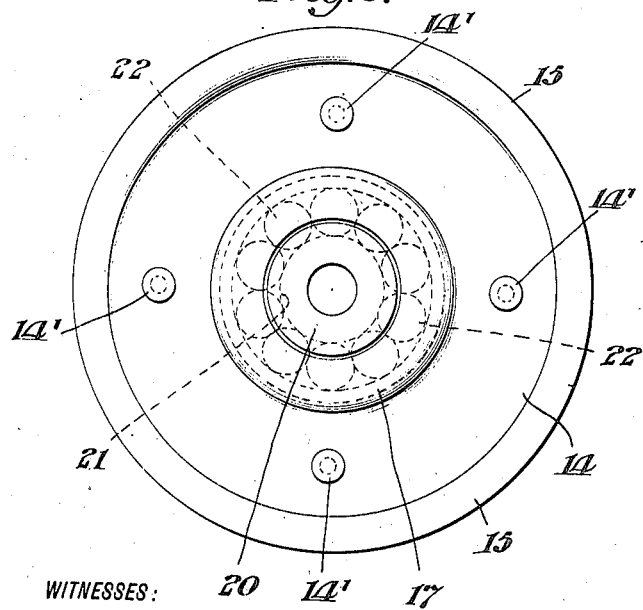

In the drawings, Figure 1 is a side elevation of a traction or belt wheel embodying my improvements; Fig. 2 is a sectional view taken through the axis of the construction shown in Fig. 1; Fig. 3 is a side elevation of a second form of belt wheel or pulley embodying my improvements; and Fig. 4 is a sectional view taken through the axis of the construction shown in Fig. 3.

The form of the invention shown in Figs. 1 and 2 comprises the soft laminated metal webs 1 provided with outwardly turned peripheral flanges 2 forming substantially cylindrical bearings and the concentric interior flanges 3 forming a substantially concave bearing or channel, the webs being secured together by rivets 4. A soft metal peripheral band 5 is disposed on the flanges 2 and is provided with inturned flanges 6 engaging the flanges 2, whereby the latter are braced, the band is held in position, and a strong peripheral construction is provided. Unequal hard metal race ring sections 7 and 8 are disposed within the outwardly expanded flanges 3, the juncture of the sections being eccentric to the central plane of the wheel so that resultant thrusts transmitted to the ring sections are not at the joint. A hard metal hub 9, having a circular race 10, is disposed within the flanges 3 with the race 10 in registration with the race 7—8. Balls 11 are disposed in the races 10 and 7—8 whereby the wheel body is revoluble on the hub through a ball bearing especially designed for carrying radial thrusts. The hub 9 is provided with the beveled peripheral surfaces 12 on the opposite sides thereof, and the flanges 3 are provided with lips 13 conforming to such beveled surfaces, whereby security is provided against axial movement of the wheel body or hub relatively to each other, and the bearings are protected.

Figure 4:
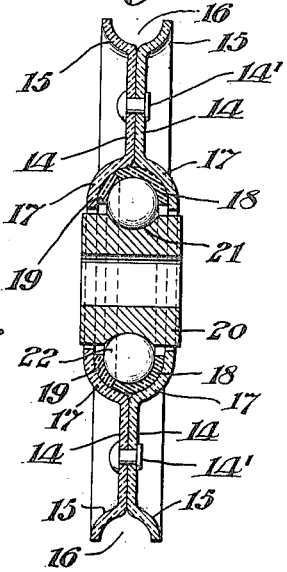

The form of the invention illustrated in Figs. 3 and 4 comprises a wheel body having the soft metal webs 14 (connected by rivets 14') with outwardly extending peripheral flanges 15 thereon (forming a peripheral channel 16 for carrying a round belt) and the outwardly expanded internal flanges 17 forming a concave channel for holding the unequal hard metal race ring sections 18 and 19. A hard metal hub 20 has its axis disposed in the axis of the wheel body and is provided with a peripheral race 21 registering with the race formed by the ring sections 18 and 19. Balls 22 are disposed in the races, the wheel body and hub are thereby held against relative axial movement, and the wheel body is revoluble on the hub through a ball bearing especially designed for carrying radial thrusts.

Having described my invention, I claim:

1. A wheel having a body comprising radial webs disposed in laminated relation with outwardly turned peripheral flanges extending substantially at right angles thereto and interior flanges providing a concave bearing of approximately circular cross section intersecting the planes of said webs, a band on said peripheral flanges and provided with inturned flanges engaging the outer edges thereof, a race ring conforming to and disposed within said interior flanges, and means comprising a hub and balls engaging said hub and ring whereby said body is supported and journaled.

2. A wheel having a body comprising soft metal webs disposed in laminated relation with outwardly extending peripheral flanges and outwardly expanded internal flanges, rivets extending through said webs for holding them together, hard metal rings forming a race within said internal flanges coincident with the planes of said webs and having a joint removed from the central plane of said wheel, a hard metal hub having a race, and balls disposed in said races whereby said body and hub are held against relative axial movement, the outer surface of said hub lying within said internal flanges.

In testimony whereof, I have hereunto set my name this 10th day of September, 1913, in the presence of the subscribing witnesses.

BUDD G. NICE.

Witnesses:
Jos. G. Denny, Jr.,
C. N. Butler.